US009524011B2

(12) United States Patent
Hall et al.

(10) Patent No.: US 9,524,011 B2
(45) Date of Patent: Dec. 20, 2016

(54) INSTRUCTION LOOP BUFFER WITH TIERED POWER SAVINGS

(71) Applicant: Apple Inc., Cupertino, CA (US)

(72) Inventors: Ronald P. Hall, Austin, TX (US); Michael L. Karm, Cedar Park, TX (US); Ian D. Kountanis, Santa Clara, CA (US); David J. Williamson, Austin, TX (US)

(73) Assignee: Apple Inc., Cupertino, CA (US)

( * ) Notice: Subject to any disclaimer, the term of this patent is extended or adjusted under 35 U.S.C. 154(b) by 287 days.

(21) Appl. No.: 14/251,508

(22) Filed: Apr. 11, 2014

(65) Prior Publication Data

US 2015/0293577 A1 Oct. 15, 2015

(51) Int. Cl.
*G06F 1/26* (2006.01)
*G06F 1/32* (2006.01)
*G06F 9/00* (2006.01)
*G06F 9/30* (2006.01)

(52) U.S. Cl.
CPC ......... *G06F 1/3234* (2013.01); *G06F 9/30058* (2013.01); *G06F 9/30065* (2013.01)

(58) Field of Classification Search
CPC . G06F 1/3234; G06F 9/30058; G06F 9/30065
See application file for complete search history.

(56) References Cited

U.S. PATENT DOCUMENTS

| 5,335,330 | A | * | 8/1994 | Inoue | G06F 9/325 |
| | | | | | 712/E9.078 |
| 5,475,847 | A | | 12/1995 | Ikeda | |
| 5,887,179 | A | * | 3/1999 | Halahmi | G06F 1/3203 |
| | | | | | 712/E9.078 |
| 6,959,379 | B1 | | 10/2005 | Wojcieszak et al. | |
| 8,370,671 | B2 | * | 2/2013 | Levitan | G06F 1/3203 |
| | | | | | 713/324 |
| 2009/0113191 | A1 | | 4/2009 | Hall et al. | |
| 2009/0113192 | A1 | | 4/2009 | Hall et al. | |
| 2009/0217017 | A1 | | 8/2009 | Alexander et al. | |
| 2012/0079303 | A1 | | 3/2012 | Madduri | |
| 2012/0117362 | A1 | | 5/2012 | Bhargava et al. | |
| 2012/0159125 | A1 | | 6/2012 | Hall et al. | |
| 2012/0179924 | A1 | | 7/2012 | Sugiyama et al. | |
| 2012/0185673 | A1 | | 7/2012 | Yoo et al. | |
| 2012/0185714 | A1 | | 7/2012 | Chung et al. | |
| 2013/0339699 | A1 | | 12/2013 | Blasco-Allue et al. | |
| 2013/0339700 | A1 | | 12/2013 | Blasco-Allue et al. | |

* cited by examiner

*Primary Examiner* — Mark Connolly
(74) *Attorney, Agent, or Firm* — Meyertons, Hood, Kivlin, Kowert & Goetzel, P.C.

(57) ABSTRACT

Techniques are disclosed relating to power reduction during execution of instruction loops. Multiple different power saving modes may be used by a processor, such as a first power saving mode after only a few loop iterations (e.g., 2-3) and a second, deeper power saving mode after a greater number of loop iterations. The first power saving mode may include keeping a branch predictor and/or other structures active, but the second power saving mode may include reducing power to the branch predictor and/or other structures. An observation mode and an instruction capture mode may also be used by a processor prior to entering a power saving mode for loop execution. Power saving modes may also be achieved during execution of complex loops having multiple backward branches (e.g., nested loops).

20 Claims, 6 Drawing Sheets

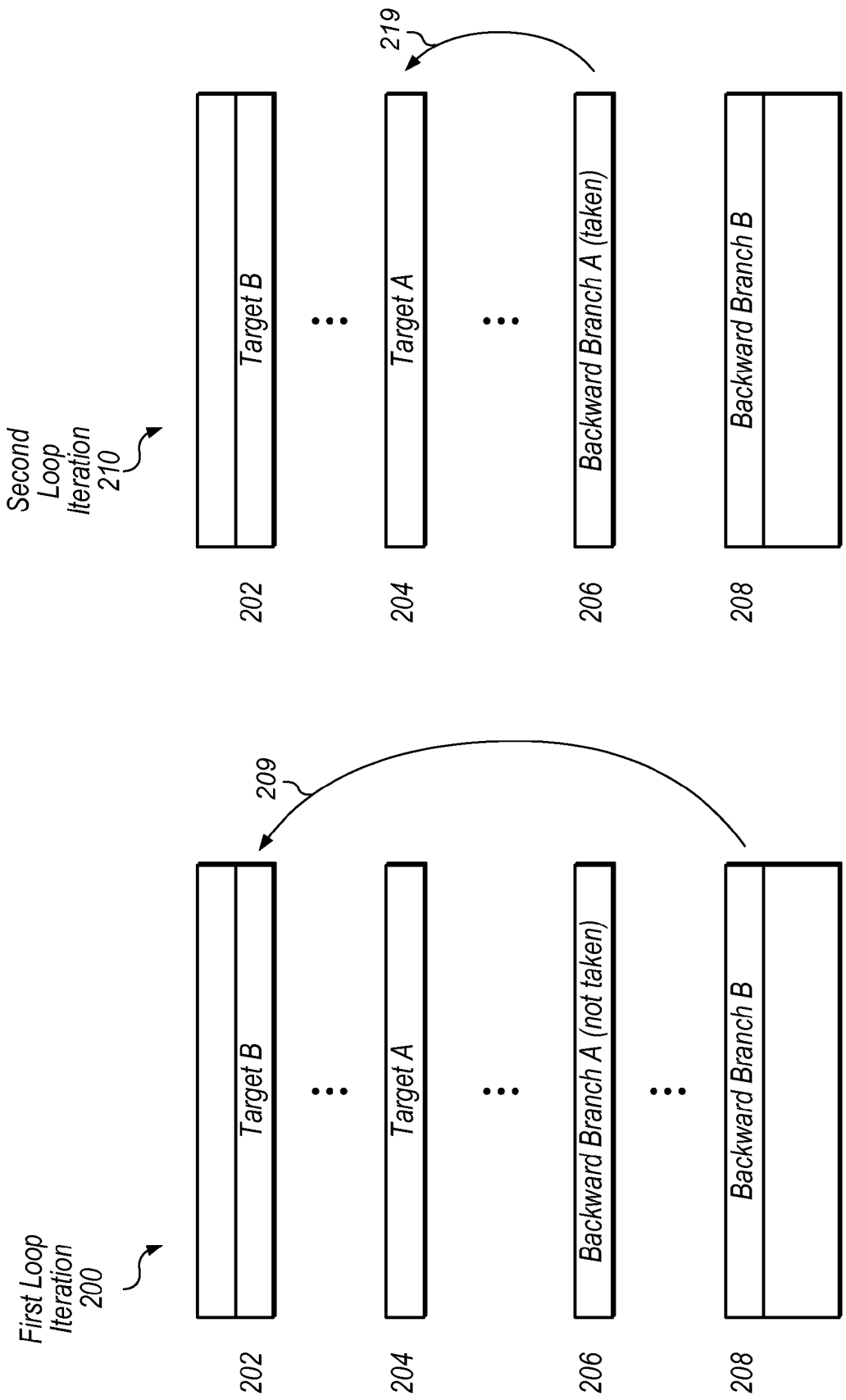

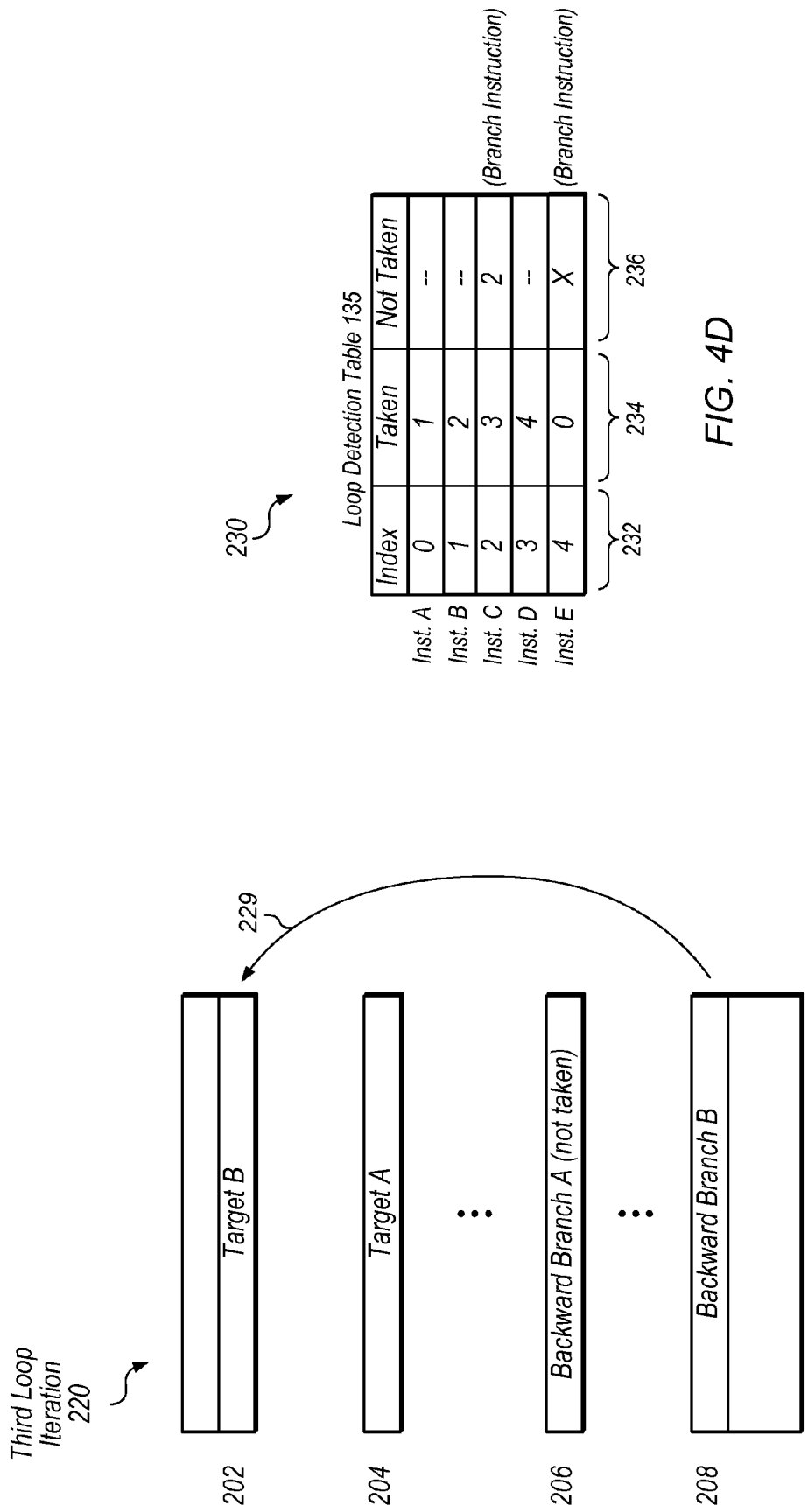

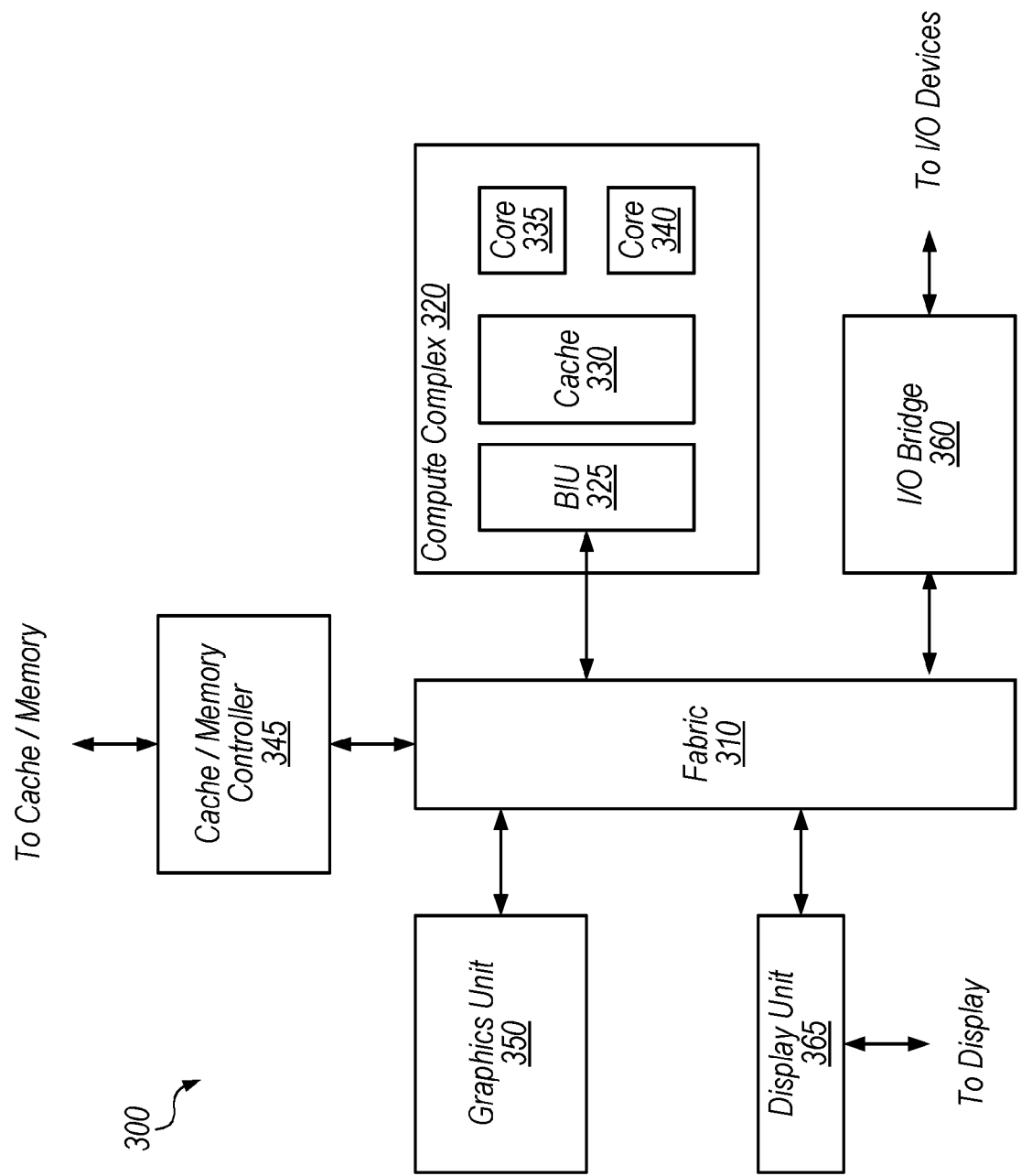

INSTRUCTION LOOP BUFFER WITH TIERED POWER SAVINGS

BACKGROUND

Technical Field

This disclosure relates generally to computer processing, and includes discussion of techniques and structures usable to reduce power consumption during execution of an instruction loop.

Description of the Related Art

Before being executed by a processor, instructions are frequently stored in a cache. As an instruction stream is executed, the cache may be continually updated, and provide new instructions to execution pipelines within the processor. In some instances, a series of instructions may be repeatedly executed as part of an instruction loop. Power that is supplied to certain structures within a processor (such as an instruction cache or branch predictor) during execution of an instruction loop may be unnecessarily used, however, as there may be little or no benefit in some instances to performing certain operations while a (relatively small) group of instructions is repeatedly executed during the loop.

SUMMARY

During execution, a loop control circuit may detect when a loop has occurred in a series of instructions. In some approaches, a processor may attempt to save power by using a special dedicated storage structure (such as a loop buffer) during execution of the loop, once a significant number (e.g. 20+) observations of a loop have occurred. In such approaches, it may be necessary to observe a large number of loop iterations before attempting power-saving operations, as it may be necessary to determine that a loop has reached a "steady state" (for example, that the output of a branch predictor will be unchanged for subsequent loop iterations). Certain front-end structures may be clock-gated or powered off once a power saving mode has been entered.

In the present specification, multiple different power savings modes are disclosed for use with execution of instruction loops. Additionally, rather than using a special dedicated instruction cache just for loop execution, for example, an instruction buffer that is already used to provide instructions to an execution pipeline (e.g., during ordinary operation) may also be used to cache loop instructions.

After an initial condition (e.g., 2 or 3 observations of a loop) has occurred, power may be reduced in a first power saving mode. For example, instruction cache fetching and target prediction may be powered down, but a branch predictor may be kept active, providing a first level of power savings. In this first level of power savings, all instructions in the loop may have been captured in an instruction buffer (so that the cache is not needed, for example), but a branch predictor may be kept fully active until execution of the loop has progressed to a steady state in which the output of branch predictor is unchanging. After a second condition (e.g., 20 observations of a loop) has occurred, additional structures may be powered down—e.g., the branch predictor—providing a second, deeper level of power savings. The first power saving mode may also be used in conjunction with complex instruction loops in some cases, as further discussed herein.

By using multiple power saving modes during execution of loops, additional power savings may be achieved even for small loops, as opposed to other schemes where a large number of loop iterations may be required in order to begin saving any power. Such power savings may be particularly helpful in battery powered devices such as mobile phones, tablets, etc., or in other devices where power consumption may be a concern.

BRIEF DESCRIPTION OF THE DRAWINGS

FIGS. 4A-4C are diagrams illustrating embodiments of execution for different iterations of a complex loop. FIG. 4D is a diagram illustrating one embodiment of a portion of a loop detection table for use with complex loops.

FIG. 6 is a diagram illustrating one embodiment of a device that includes one or more processors.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure. Further, the term "one or more" in this disclosure may refer to one or more of something, the terms "a" or "an" may also refer to one or more of something. In other words, the terms "a" and "an" are open ended and do not refer to only a single item unless specifically stated. (Thus, for example, the term "an execution pipeline" does not preclude the existence of two or more execution pipelines.)

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

DETAILED DESCRIPTION

Figure 1:
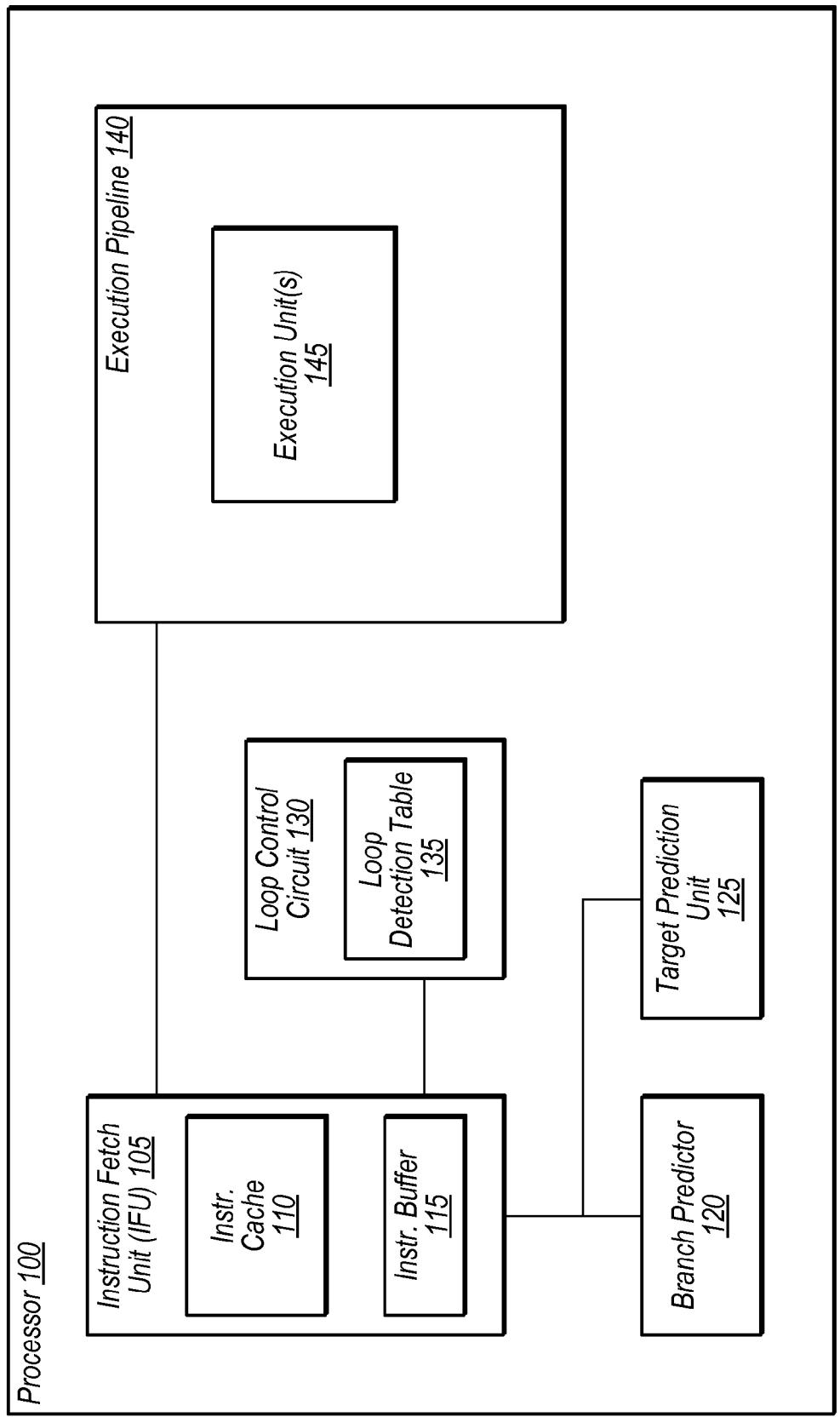
FIG. 1 is a diagram illustrating one embodiment of a processor.

Referring to FIG. 1, a block diagram is shown illustrating one embodiment of a processor 100. Processor 100, in the illustrated embodiment, includes instruction fetch unit (IFU) 105, which in turn includes instruction cache 110 and instruction buffer 115. Processor 100 also includes a branch predictor 120, target prediction unit 125, loop control circuit 130 containing a loop detection table 135, and an execution pipeline 140 containing one or more execution units 145.

Various features and embodiments of the structures in the illustrated embodiment of processor 100 are described herein. However, it is noted that the processor of FIG. 1 is merely one example of how a processor may be implemented. Various alternative configurations and variations are possible and contemplated. Further, various structures are shown in FIG. 1 as being connected to one another. These connections may be a bus, point-to-point transmission line, or any other suitable connection as would be known to a person of skill in the art. Not all connections or interfaces between structures in processor 100 are necessarily depicted. Thus, in various embodiments, any or all of the structures depicted in FIG. 1 may be connected as needed to any or all of the other structures by one or more suitable connections. Additionally, the structures depicted in FIG. 1 may be suitably arranged and/or connected in different embodiments as would occur to one of skill in the art. Thus, in various embodiments, structures shown in FIG. 1 may be located in varying locations within processor 100, and additional structures not depicted may also be present.

The concept of "execution" in this disclosure may broadly refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load/store unit). The latter meaning may also be referred to as "performing" the instruction. Thus, "performing" a load instruction refers to retrieving the value of the load's target location, which may, in some embodiments, be accomplished by a circuit at an execute stage of a pipeline (e.g., by a load/store unit). Conversely, "executing" the load instruction may refer to the entirety of operations that occur throughout the pipeline as a result of the load instruction. Instructions may be speculatively executed, and may be flushed and replayed if one or more conditions are not as speculated. Instructions may be speculatively executed and may be "completed" when their results are committed to the architectural state of processor 100.

In the illustrated embodiment, instruction fetch unit 105 is coupled to execution pipeline 140. Thus, one or more execution units 145 of execution pipeline 140 may receive instructions to be executed from instruction fetch unit 105. Execution pipeline 140 may include additional structures in various embodiments (e.g., a decode unit, map/dispatch/retire unit, load/store unit, floating point unit, etc.).

Instruction fetch unit 105, in some embodiments, is configured to fetch instructions from instruction cache 110 and store them for downstream processing in instruction buffer 115. Instruction buffer 115 may therefore be configured to receive instructions from instruction cache 110 and provide those instructions to execution pipeline 140. Instruction buffer 115 also has a smaller capacity than instruction cache 110 for storing instructions in some embodiments (i.e., instruction cache 110 may be larger in physical area). Instruction fetch unit 105 may also perform other operations in some embodiments, such as requesting data from a cache or memory through a cache/memory interface (e.g., in response to misses in instruction cache 110), and make predictions in conjunction with branch predictor 120 and target prediction unit 125 as to the direction and target of control transfer instructions (e.g., branches). In some embodiments, instruction fetch unit 105 may include a number of data structures in addition to instruction cache 110, such as an instruction translation lookaside buffer (ITLB) and/or structures configured to store state that is relevant to thread selection and processing (in multi-threaded embodiments of processor 100, for example). In one embodiment, instruction cache 110 is an L1 cache, and additional instruction caches (e.g., L2 cache, L3 cache; not shown) may also be present in processor 100.

The term "control transfer instruction" refers to an instruction that affects the selection of the next instruction to be executed and completed. For a given program or portion of a program, flow typically proceeds in a sequential fashion. Consider the following group of instructions: ld mem1→r1; add r1, r2→r3; st r3→mem2. In this example sequence, execution and completion proceeds sequentially from the load instruction to the add instruction to the store instruction. This sequential ordering can be considered the program flow default. In this example, none of these instructions affects the selection of the next instruction to be executed and completed (beyond the default behavior).

In contrast, the execution and completion of control transfer instructions potentially affects the selection of the next instruction to be executed and completed. Control transfer instructions may include, without limitation: branches, jumps, calls, returns, etc. Instructions of these types can cause a change in the default behavior of the next instruction to be executed and completed. Control transfer instructions may be used, for example, to execute a loop of instructions. A control transfer instruction "transfers control" or results in a "control transfer" when it changes the default (e.g., sequential) execution of instructions. For example, a taken branch instruction transfers control while a branch instruction that is not taken does not transfer control. A conditional control transfer instruction may transfer control when executed a first time (e.g., when the condition is met) and may not transfer control when executed a second time (e.g., when the condition is not met).

There may also be many different types of control transfer instructions. As discussed above, control transfer instructions may operate conditionally (i.e., setting the program counter based on whether some condition is true or false) or unconditionally. Similarly, certain control transfer instructions may specify direct target addresses; other control transfer instructions may specify indirect target addresses. Note that the execution and completion of control transfer instructions may also have effects on processor state other than on the location of the next instruction (e.g., there might be an instruction that transfers control after performing an arithmetic operation or an instruction that both transfers control and alters a condition flag).

Further, as used herein, the term "instruction" refers to information indicative of one or more operations to be performed by a processor pipeline. An "operation" may include a processing element doing nothing during a given processing cycle, e.g., based on a "nop" instruction or a conditional instruction for which the condition is false. An instruction may be defined by a given ISA. An instruction may also be defined by a microarchitecture rather than tied to a particular ISA. For example, a decode unit may be configured to decode an ISA instruction into one or more micro-operations, which may also be referred to as "instructions" when they specify an operation to be performed by a processor pipeline. Thus, a control transfer instruction may or may not be defined by an ISA.

In the embodiment of FIG. 1, loop control circuit 130 is configured to detect instruction loops. The term "instruction loop" may refer, in one embodiment, to one or more instructions that occur in program order and terminate with a branch having a backward target of an earlier instruction. If the branch is taken in the appropriate direction, execution jumps backwards, and the same previously executed instructions will be executed again. The loop will continue until an exit condition for the loop is met, at which time execution of the branch will result in exiting the loop by taking an alternate direction for the branch (i.e., rather than jumping backward for another iteration of the loop). Thus, in some embodiments, an instruction loop may be as little as one instruction (e.g., a "wait" instruction in some instruction set architectures), or may be several instructions. In other embodiments, an instruction loop may also refer to one or more instructions that include one or more forward branches and/or one or more backward branches (that are not taken), followed by a backward branch that is taken. In other words, in various embodiments, an instruction loop may refer to any group of one or more instructions that has a backward branch that is taken during the first iteration of the instruction group. The term instruction loop may also refer to a complex instruction loop having multiple backward branches that are taken in some instances (e.g., as discussed relative to FIGS. 4A-4C). Thus, as used herein, the term "simple instruction loop" refers to a group of one or more instructions terminating in an always-taken backward branch (until an exit condition is met), in which the order of instructions does not change during execution of the loop (e.g., the order of program counter (PC) addresses does not change). The term "complex instruction loop", however, refers to a group of one or more instructions including an always-taken backward branch (until an exit condition is met) in which the order of instructions may change during execution of the loop (e.g., there may be backward branches and/or forward branches inside the complex instruction loop that are sometimes taken and sometimes not taken, as further discussed below).

Loop control circuit 130 may therefore detect a loop by detecting execution of a backwards branch that is taken. Loop control circuit 130 may also use loop detection table 135 to store information related to execution of instructions and/or execution of instruction loops in various embodiments. Such information for loop detection table 135 is discussed further below relative to FIG. 3.

Power savings for processor 100 may be achieved by loop control circuit 130 as described below. In some scenarios, only a single power saving mode may be available in association with detection of a loop. Such an approach may be less efficient, however, than embodiments in which multiple different power saving modes are supported during execution of a loop.

Thus, in the embodiment of FIG. 1, loop control circuit 130 is configured to, during execution of an instruction loop, cause processor 100 to enter into one of a plurality of power saving modes based on the occurrence of one or more particular conditions during execution of the instruction loop. Loop control circuit 130 thus allows for multiple different power saving modes in which different structures of processor 100 may be operated at lower power levels or turned off. In some instances, multiple different power saving modes may allow processor 100 to quickly begin saving power during execution of a loop (e.g., after 2 or 3 loop iterations in some embodiments), while entering a deeper level of power savings after a larger number of iterations has occurred (e.g., after 20+ loop iterations in one embodiment).

Different power saving modes may therefore be used based on the number of times a loop has been executed. In the embodiment shown, loop control circuit 130 is configured to cause processor 100 to enter into a first power saving mode based a first condition that includes an instruction loop being executed at least twice. In this embodiment, the first power saving mode includes reducing power to one or more structures of processor 100. (Note that the term "reducing power", as applied to a structure of a processor, includes operations that cause that that structure to consume less power. Accordingly, reducing power to a processor structure may be achieved in various embodiments by using clock gating or other such techniques known to those skilled in the art.)

In one embodiment, the first power saving mode includes reducing power consumption by instruction cache 110 (e.g., both data and tags). In some embodiments, the first power saving mode also includes reducing power to target prediction unit 125, an instruction translation lookaside buffer (ITLB), and/or a return address stack (RAS). In various embodiments, however, the first power saving mode does not include reducing power to one or more structures that are additionally powered down during a second (deeper) power saving mode.

Accordingly, loop control circuit 130 is also configured, in the embodiment shown, to cause processor 100 to enter into a second power saving mode based a second condition that includes an instruction loop being executed a greater number of times than required for the first power saving mode. In one embodiment, a prediction history for branch predictor 120 corresponds to the number of loop iterations that occur before loop control circuit 130 causes processor 100 to enter the second power saving mode, as discussed further below.

During a first power saving mode, for example, branch predictor 120 may initially remain fully active during execution of an instruction loop. This allows branch predictor 120 to make a prediction as to the direction of a branch that terminates the instruction loop (or any other branch inside the loop, in some instances). If branch predictor 120 is active and predicts that the instruction loop will be exited, for example (rather than the branch jumping back for another iteration of the loop), it may be possible to boost performance of processor 100 by having instruction fetch unit 105 retrieve additional instructions from instruction cache 110 (which may avoid performing a full pipeline flush in some cases). In various embodiments, branch predictor 120 therefore has an associated prediction history that is used to predict branch direction.

After a number of loop iterations, however, the prediction history for branch predictor 120 may become saturated (full). Once the prediction history is saturated, and the loop continues to execute, there may be essentially no new information being added to the prediction history. In other words, in some embodiments, once a loop has executed a sufficient number of times, branch predictor 120 may simply always make the same prediction, e.g., that the loop will continue (rather than exit). Once the instruction loop has executed enough times that branch predictor 120 has a saturated history (e.g., always predicts the loop will continue), power to branch predictor 120 can be reduced, as it is not delivering any new information.

Accordingly, in one embodiment, a second power saving mode includes reducing power to branch predictor 120 (while the first power saving mode does not include reducing power to this structure). The second power saving mode also includes, in some embodiments, reducing power to target prediction unit 125. The second power saving mode may also include reducing power, in various embodiments, to a branch target predictor (BTP), branch direction predictor (BDP), and/or a fetch prediction table (FPT). A fetch prediction table, in one embodiment, is configured to make a prediction as to the address or location of a group of one or more instructions that should be fetched for execution (e.g., from cache 110). (Also note that in various embodiments, the second power saving mode includes all of the power-saving features that are also used by the first power saving mode.)

Figure 2:
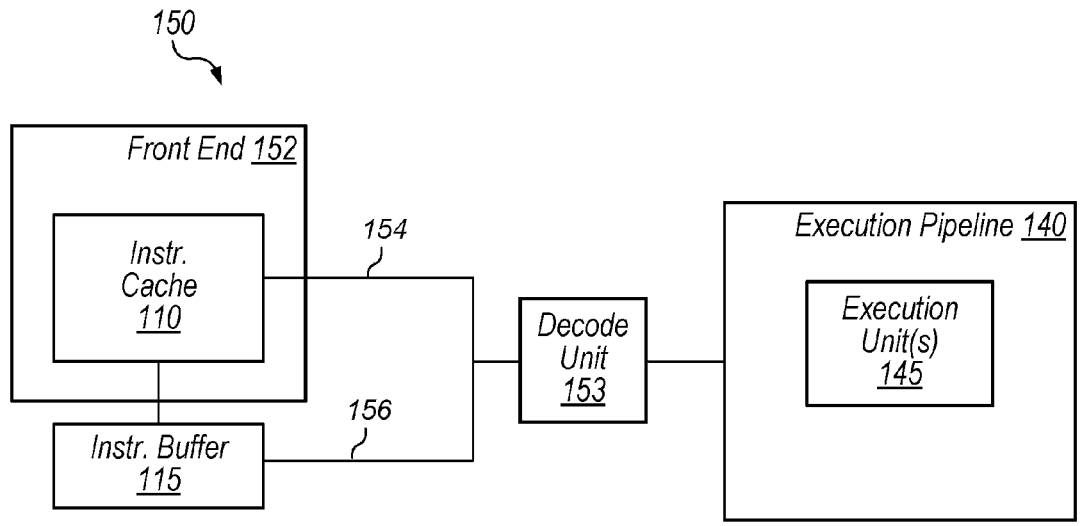
FIG. 2 is a diagram illustrating one embodiment of a system that is a portion of a processor.

Turning to FIG. 2, one embodiment of a system 150 is shown. System 150 is a portion of processor 100 in one embodiment, and includes a front end structure 152 containing instruction cache 110; a decode unit 153; instruction buffer 115; and execution pipeline 140. As depicted, system 150 also includes an instruction bypass 154 and an instruction write channel 156. Bypass 154 is configured to provide instructions from instruction cache 110 directly to execution pipeline 140 in the embodiment shown (e.g., during a bypass write window), while instruction write channel 156 is configured to provide instructions from instruction buffer 115 to execution pipeline 140. Multiplexing structures allow instruction bypass 154 and write channel 156 to provide instructions to decode unit 153 without conflict in the embodiment shown.

Front end 152, in the embodiment shown, includes instruction cache 110, a cache directory configured to indicate validity of contents of instruction cache 110, various predictors (e.g., branch direction predictor, branch target predictor, and next fetch program counter (PC) predictor), an ITLB, and a fetch pipeline. In other embodiments, front end 152 may include any combination of these structures, additional structures, or may omit one or more of the previously listed structures. Decode unit 153 is depicted separately from execution pipeline 140 as shown, but may be included in execution pipeline 140 in various embodiments. As described below, in some embodiments, a second power saving mode used during execution of instruction loops may include reducing power to all structures included in front end 152, while a first power saving mode may include reducing power to only certain instructions included in front end 152, in accordance with the disclosure above.

Generally, in various embodiments, instructions to be executed by execution pipeline 140 may be stored in instruction buffer 115 beforehand. Instruction buffer 115 may provide one or more instructions (e.g., in a given clock cycle) to execution pipeline 140 according to the needs and capabilities of the execution pipeline. A decode unit within execution pipeline 140, for example, might have greater or lesser capacity at a given time to accept a number of new instructions for execution (e.g., depending on the type of instruction(s) and/or other instructions that are currently being executed). Instruction buffer 115 may therefore help alleviate timing issues in various embodiments. In some instances, however, instructions may arrive at one or more execution units 145 without being first stored in instruction buffer 115 (e.g., because instruction buffer 115 was bypassed).

In one embodiment, instruction buffer 115 serves a dual function as a loop buffer in addition to the functionality described above. That is, instructions for a loop may be stored within instruction buffer 115 while power is reduced to other structures (e.g., instruction cache 110). Thus, while the loop is being executed, instructions may therefore be read only from instruction buffer 115, which reduces power requirements of processor 100 in one embodiment. Instruction buffer 115 is therefore configured, in some embodiments, to provide instructions to execution pipeline 140 during all loop-related power saving modes that are supported (i.e., any power saving mode may include having instructions provided to execution pipeline 140 from instruction buffer 115 and not cache 110).

Accordingly, under ordinary operation for processor 100 (before a loop is detected and when not in one of a plurality of power saving modes instigated by loop control circuit 130), not all instructions executed by execution pipeline 140 are necessarily delivered via instruction buffer 115, because instruction bypass 154 allows instructions to be transmitted directly to execution pipeline 140 from instruction cache 110. Further, during ordinary operation, instructions in instruction buffer 115 may be deleted and overwritten with newer instructions to be executed as older instructions are delivered to execution pipeline 140.

In order to use instruction buffer 115 as a loop buffer, however, it may be necessary in some embodiments to cause processor 100 to enter a capture mode in which instructions are forced to be written to instruction buffer 115 (e.g., in association with or before being delivered to execution pipeline 140). Thus, without first disabling bypass 154 or otherwise forcibly writing instructions to instruction buffer 115, in various embodiments, instruction buffer 115 might contain gaps (missing instructions) in a sequence of instructions. Capture mode therefore may cause all instructions for a loop to be stored in instruction buffer 115 (rather than having possible gaps). Note that in some embodiments, capture mode does not include disabling bypass 154. In such embodiments, bypass 154 may still be used to deliver instructions to execution pipeline 140, but instructions transmitted via bypass 154 may also be forcibly written to instruction buffer 115 (so that all instructions for a loop will be written into that buffer, for example).

As discussed below, an observation mode may also be employed by loop control circuit 130 prior to engaging in capture mode. In observation mode, in one embodiment, instructions are not forcibly written to instruction buffer 115, but information regarding the instructions is recorded.

Accordingly, in one embodiment, loop control circuit 130 is configured to, in response to detecting a first (initial) execution of a backward branch, cause processor 100 to enter an observation mode in which information regarding an instruction loop is stored in loop detection table 135. Information regarding the instruction loop may include, in various embodiments, a starting address of the loop (e.g., target address of the backward branch) and a terminating address of the loop (e.g., address of the backward branch). In some embodiments, other information usable to determine the starting address and/or terminating address of the loop may be stored in loop detection table 135 (e.g., fetch group). An iteration count for a loop may also be maintained by loop detection table 135 in some embodiments (e.g., number of times a backward branch has been executed). Additional information may also be stored in loop detection table 135 in some instances, including embodiments in which power savings is used in association with complex loops, as discussed below.

Using an observation mode before a capture mode may provide a performance boost in some scenarios, as forcibly entering a capture mode after only the first time a backward branch is executed will immediately result in loss of the ability to send instructions via bypass 154 in some embodiments. A single instance of a backward branch does not always indicate that a loop will be entered, for example, so observation mode allows confirmation of a loop in one embodiment without possibly sacrificing performance (e.g., by disabling bypass 154). As noted above, however, using capture mode does not always entail turning off instruction bypass 154 instead, in such embodiments, bypass 154 may still be used to send instructions to execution pipeline 140, but bypassed instructions may also be written to instruction buffer 115. (In one such embodiment, instructions that are stored in instruction buffer 115 but have also been transmitted via instruction bypass 154 will be marked as invalid in instruction buffer 115 so that they are not inadvertently re-transmitted to execution pipeline 140, for example).

Accordingly, loop control circuit 130 is configured, in one embodiment, to cause processor 100 to enter an observation mode in response to detecting a first execution of a backward branch, and enter a capture mode in response to detecting a second execution of a backward branch (i.e., that a loop has been executed twice). In the capture mode, as discussed above, all instructions being fetched (for the loop) are forcibly stored in instruction buffer 115 (e.g., by disabling bypass 154 or otherwise forcing the instructions to be stored). In a further embodiment, loop control circuit 130 is also configured to cause processor 100 to enter into a first one of a plurality of power saving modes after one loop iteration has been performed in capture mode, and the loop has been stored in instruction buffer 115 (e.g., the loop has been executed three times). In the first power saving mode in this embodiment, instructions are not read from instruction cache 110, but are provided exclusively to execution pipeline 140 from instruction buffer 115 while power is reduced to cache 110. Note that as used herein, the terms "first execution", "second execution", and "third execution", when referring to execution of a branch instruction, refer to any three executions of that branch instruction in chronological order (i.e., the first execution occurs before the second, and the second execution occurs before the third). Thus, while the first, second, and third executions of a branch may respectively correspond to a first, second, and third iteration of a loop, the first, second, and third executions of a branch may also respectively correspond to a first, third, and fifth iteration of a loop, for example (and other permutations are explicitly contemplated).

In some instances, an instruction loop may also be of greater length than the instruction storage capacity of instruction buffer 115. In such cases, in response to information indicating that a size of instruction buffer 115 cannot accommodate the size of an instruction loop being executed, loop control circuit 130 may be configured not to cause processor 100 to enter into one of a plurality of power saving modes (as reading from instruction cache 110 will need to continue, in various embodiments, if a loop cannot fit in instruction buffer 115).

Figure 3:
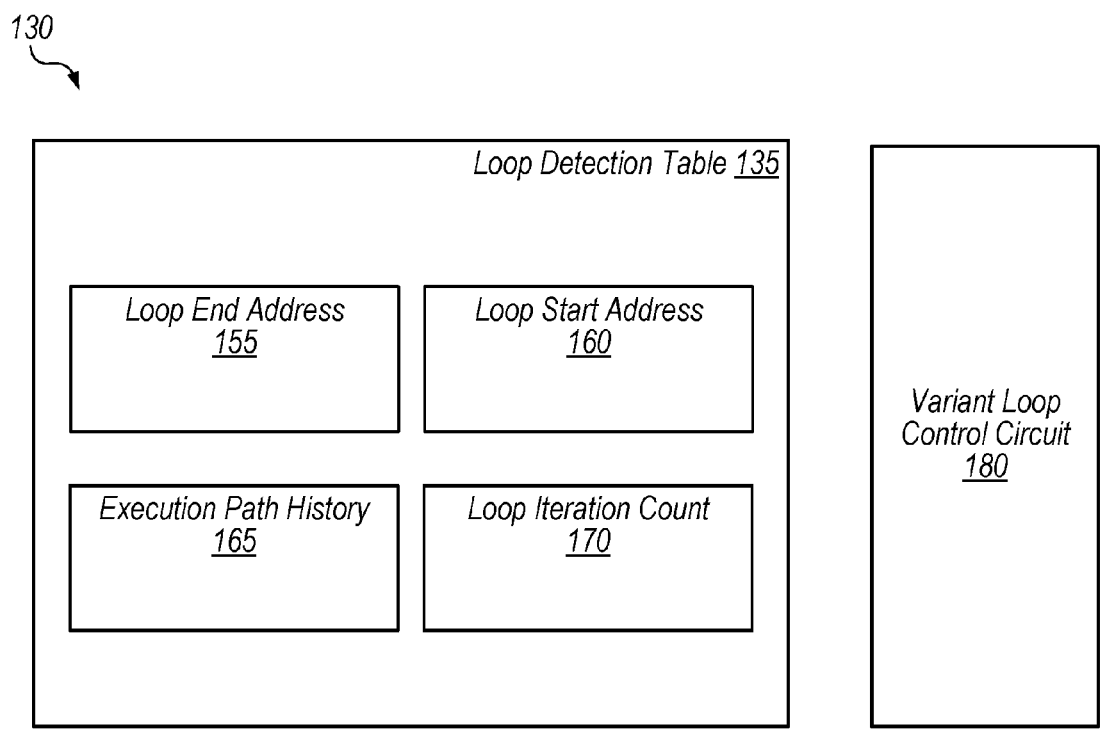
FIG. 3 is a diagram of one embodiment of a loop control circuit that includes a loop detection table and a variant loop control circuit.

Turning to FIG. 3, a diagram is shown of one embodiment of loop control circuit 130. In the embodiment of FIG. 3, loop control circuit 130 includes loop control detection table 135 as well as variant loop control circuit 180. Information stored in loop detection table (LDT) 135 may be maintained and updated by loop control circuit 130 (and/or variant loop control circuit 180) during execution of instructions. Additionally, as discussed below, variant loop control circuit 180 allows a plurality of power saving modes for processor 100 to be used in conjunction with more complex instruction loops, in various embodiments. In some instances, a first power saving mode may be used in conjunction with a complex instruction loop, where no power saving mode would otherwise be possible (e.g., a deeper power saving mode associated with only 20+ iterations of a simple loop). As shown, LDT 135 includes a loop end address 155, a loop start address 160, an execution path history 165, and a loop iteration count 170. Values associated with these items may be updated during execution by loop control circuit 130 and/or other structures within processor 100 in various embodiments. LDT 135 may also include additional information stored in association with complex instruction loops, as discussed herein.

In one embodiment, loop control circuit 130 stores a loop end address 155 in LDT 135 upon the first detection of a taken backward branch during execution of instructions. Loop end address 155 thus includes, in various embodiments, a program counter (PC), portion thereof, and/or information usable to locate an instruction fetch group associated with the end of a loop. Loop start address 160 corresponds to the target address of a backward branch, and likewise includes a PC, portion thereof, and/or other information usable to locate an instruction fetch group associated with the start of the loop.

Execution path history 165 includes information usable to determine a history of an execution path for a loop. Accordingly, execution path history may include, in various embodiments, a list of PCs (or portions thereof) for instructions in a loop and/or fetch group information usable to locate such instructions (e.g. within cache 110). Execution path history 165 may also include other information, such as whether a forward branch (e.g. jump) is taken or not taken in a particular iteration, as well as target and return addresses or similar information (fetch groups for targets and/or returns) in various embodiments. Loop iteration count 170 includes a count of how many times a loop has been executed (e.g., how many times a particular backward branch has been taken).

The structures shown in LDT 135 may also be adapted for use with more complex loops. For example, in a loop having an A-B-A-B execution pattern (as described below relative to FIGS. 4A-4C), multiple different loop start/end addresses and iteration counts may be maintained by LDT 135 corresponding to an inner (nested) loop and a larger outer loop. Execution path history 165 may also be modified appropriately to reflect complex loop execution paths (e.g. keeping track of inner and outer loops during execution).

Variant loop control circuit 180 is configured, in various embodiments, to cause loop control circuit 130 to detect complex instruction loops that, when executed, include multiple backward branches that are taken. Such loops are described with greater detail below relative to FIGS. 4A-4C. Loop control circuit 130 may therefore be configured to cause processor 100 to enter into different ones of a plurality of power saving modes during execution of complex instruction loops in one embodiment. Conditions for entering first and second power saving modes during execution of complex instruction loops are the same ones, in some embodiments, as the conditions described above relative to other loop iterations (e.g., entering a first power saving mode after a certain number of iterations of a loop, entering a second a second power saving mode after a greater number of iterations of a loop). Note that in some embodiments, variant loop control circuit 180 may be combined as a single circuit with loop control circuit 130 (and thus, actions described as being performed by variant loop control circuit 180 may be performed by loop control circuit 130 in various embodiments).

Turning to FIG. 4A, a diagram is shown of one embodiment of one execution iteration 200 of a complex loop that includes instructions 202, 204, 206, and 208. Note that the term complex loop, as used herein, refers to an outer instruction loop terminated by one always-taken backward branch (at least until an outer loop exit condition is met), but that also contains one or more other backwards branches that constitute one or more inner loops which may be taken (or not taken) in various iterations. As shown in the embodiment of FIG. 4A, instruction 202 corresponds with the beginning of execution for an outer loop that is terminated by instruction 208. In this example, the first iteration 200 of the outer loop ends with jump 209 being taken from instruction 208 to instruction 202. Instruction 206 is a backward branch, but is not taken in first iteration 200.

Turning to FIG. 4B, a second iteration 210 of the same outer loop begins at instruction 202 (following jump 209 from FIG. 4A). In this second iteration, however, execution of instruction 206 results in backward jump 219, and instructions subsequent to instruction 206 are not executed (instruction 208 is therefore not executed in this iteration).

Turning to FIG. 4C, a third iteration 220 of the complex loop begins at instruction 204 (following jump 219 from FIG. 4B). In this iteration, the backward branch of instruction 206 is once again not taken, similar to FIG. 4A. However, the backward branch of instruction 208 is taken, resulting in jump 229. A subsequent fourth iteration of the complex loop will begin again at instruction 202. Note that the term iteration, as applied to complex loops, refers to an execution sequence resulting in a backward jump—thus, a complete iteration of an outer loop, or a partial iteration of an outer loop that results in a backward jump prior to the outer backward branch (e.g., as in FIG. 4B).

Accordingly, in the example of FIGS. 4A-4C, the complex loop shown may iterate in an alternating B-A-B-A pattern (with "B" iterations corresponding to backward branch instruction 208 being taken, and "A" iterations corresponding to backward branch instruction 206 being taken). Variant loop control circuit 180 is configured to detect such patterns and to allow loop control circuit 130 to cause processor 100 to enter into power saving modes that might not otherwise be accommodated in some embodiments (e.g., in one embodiment, a loop iteration count maintained by loop detection table 135 might never exceed one if a B-A-B-A complex loop pattern occurred, as the same backward branch is not taken twice in a row in such a pattern).

Variant loop control circuit 180 is also configured to detect other patterns in various embodiments, such as an A-B-C-A-B-C pattern (corresponding to an outer loop having two inner loops with different backward branches). The disclosure of U.S. application Ser. No. 14/160,242 ("Cache for Patterns of Instructions"), filed Jan. 21, 2014, is herein incorporated by reference, and discusses additional details regarding execution patterns. Logic, techniques, and structures described therein may be used or adapted for use with the present disclosure (e.g., with respect to loop control circuit 130 and variant loop control circuit 180) in order to cause processor 100 to enter into one of a plurality of power saving modes in complex loop scenarios. Other patterns that may exist and be used by variant loop control circuit 180 include A-B(N)-A-B(N), where the B nested loop is repeated N number of times, N being greater than 1). More generally, variant loop control circuit 180 may be used in conjunction with loop detection table 135 to detect (and allow power savings for) any complex loop of sufficient size to fit in instruction buffer 115, as information may be maintained by LDT 135 indicating what instructions in the complex loop are next (depending, for example, on whether or not a nested branch in the complex loop is taken or not taken), as discussed below.

Accordingly, loop detection table (LDT) 135 is configured to store additional information relating to complex instruction loops in various embodiments. In such embodiments, LDT 135 may also store any or all of the information discussed above relative to FIG. 3, while an observation and capture mode related to those described above may also be used in association with complex loops.

In one embodiment involving support for complex loops, upon detecting a first execution of a particular backward branch, the PC for the particular branch is stored in LDT 135, and an observation mode begins. Note that for ease of description, the term "PC" or "address" is used in some examples herein as identifying an instruction location, but in various embodiments, such an identifier may be the entire PC, a portion thereof, or other information (e.g., fetch group information) that is usable to determine the location of an instruction, as will be known to those with skill in the art.

During this observation mode, variant loop control circuit 180 may record various information in LDT 135 about a group of one or more instructions that includes the particular backward branch. As described above, this information may include the address of the particular backward branch, the target address of the backward branch, and a loop iteration count (e.g., number of executions of the particular backward branch). Variant loop control circuit 180 may also keep track of a total number of instructions executed, including the backward branch (to determine, for example, if the loop is sufficiently small to be stored within instruction buffer 115). In some embodiments in which complex loops are not supported, observation mode may be exited and ordinary operations are resumed if a different backward branch is executed before a second, subsequent execution of the particular backward branch occurs (i.e., observation mode may be exited if a complex loop is indicated, but support for complex loops is not present).

In embodiments in which complex loops are supported, however, observation mode may continue until a second execution of the particular backward branch occurs, at which point a capture mode may be initiated (assuming that observation mode has not indicated a loop is too large for instruction buffer 115, for example). Similar to the disclosure explained above relative to FIG. 3, however, in some embodiments in which complex loops are supported, observation mode may be omitted and capture mode may be directly engaged based on a first execution of the particular backward branch. During capture mode for complex loops, instructions are forcibly stored in instruction buffer 115, and corresponding information is stored in LDT 135.

Accordingly, LDT 135 may, in some embodiments, include additional information relating to execution of complex loops. Complex loops may have changing patterns of execution (branches sometimes taken or not taken), for example, that do not occur in simple instruction loops. Because instruction execution within a complex loop may be non-sequential, LDT 135 may store information indicating which loop instruction within instruction buffer 115 should be executed next following a given instruction. For example, if a branch within the complex loop is taken, one particular instruction may be next in program order, but if the branch is not taken, another instruction may be next in program order.

Further, due to non-sequential execution in complex loops where branch instructions may be sometimes taken and sometimes not taken, instructions stored in instruction buffer 115 for complex loops during a capture mode also may not be stored in sequential order within instruction buffer 115. Thus, for any given instruction in instruction buffer 115, LDT 135 may store accompanying information indicating what instruction should follow next. In some instances, a particular next instruction will be indicated for a "taken" branch, and another instruction will be indicated next for a "not taken" execution of the same branch. However, even non-branching instructions may have a next instruction in program order that is not necessarily the next (sequential) instruction entry in instruction buffer 115.

Accordingly, during a capture mode for embodiments in which complex loops are supported, population of instructions into instruction buffer 115 may therefore utilize a next-write pointer into instruction buffer 115 (which may be maintained by LDT 135) to indicate which entry should store an additional instruction for a complex loop. The next-write pointer may be updated by LDT 135 so that an existing valid entry is not overwritten. (Capture mode may likewise be exited if instruction buffer 115 becomes full during execution of a complex loop having more instructions than can be stored in instruction buffer 115).

Thus, in one embodiment in which power savings for complex loops is supported, observation mode begins based on the first execution of a backward branch, capture mode begins based on a second, subsequent execution of the same backward branch, and processor 100 enters a first power saving mode based on a third, additionally subsequent execution of the same backward branch. The first power saving mode (in embodiments in which complex loops are supported) may include any of the power saving features described above relative to other embodiments in which a first power saving mode is supported (e.g., reducing power to instruction cache 110, but not branch predictor 120). In other embodiments, however, a different condition may serve as the basis for entering a first power saving mode. For example, after a capture mode has been engaged, if one or more executions of additional backward branches (branches other than an initially occurring backward branch) occur, the first power saving mode may be engaged prior to a third execution of an initially occurring backward branch, in some embodiments.

Note that in accordance with this disclosure, power saving modes may be provided for use with both simple and complex loops. In one embodiment, upon a first execution of a backward branch (e.g., the beginning of an observation mode), it may be unknown whether the loop being executed is a simple loop or a complex loop. If a given number of iterations of the loop occur without an instruction pattern changing (e.g., 20+ iterations occur, or a branch predictor history becomes saturated), the loop may be deemed to be a simple loop, and a second, deeper power saving mode may be entered. If an instruction loop is complex, however, the execution pattern may vary by iteration, and in some embodiments, the second power saving mode will not be entered (for example, the branch predictor history may not saturate, and the branch predictor will therefore still be kept active).

Turning to FIG. 4D, a diagram 230 is shown of one embodiment of a portion of loop detection table (LDT) 135, as adapted for use with complex loops. In this diagram, LDT 135 includes instruction indices 232, next instruction taken entries 234, and next instruction not-taken entries 236. Instruction indices 232 correspond to locations within instruction buffer 115 at which loop instructions are stored. (Note that LDT 135 is not limited to the number of entries shown, and may be correspondingly larger depending on a size of instruction buffer 115 in various embodiments.)

As depicted, each of instructions A-E has a table entry in LDT 135, with information usable to determine a next instruction to be executed following that instruction. For branch instructions having two possible directions (e.g., taken or not taken), two different next instructions may be indicated. For instructions that have only one possible direction (e.g., arithmetic operations, unconditional jumps, etc.), "not taken" entries may be ignored in the embodiment shown. Each table entry in FIG. 4D may be arbitrarily assigned to different instructions for a complex (or simple) loop. That is, table entries may be non-sequential in that the order of indices 232 does not necessarily indicate a program order of execution.

In this example, execution begins with instruction A. Instruction A has a "taken" entry that indicates that index 1 (instruction B) corresponds to the next instruction to be executed from instruction buffer 115. Note that in the embodiment shown, instruction A is not a branch having two possible outcomes, and therefore the not-taken entry for instruction A is ignored. That is, regardless of the outcome of instruction A, instruction B will follow. The table entry for instruction B is similar (indicating that the instruction corresponding to index 2 will always follow instruction B).

Instruction C is a branch having two possible directions in this example. If instruction C is taken, execution will continue with the instruction corresponding to index 3 (instruction D). If instruction C is not taken, however, execution will jump back to the instruction corresponding to index 2 (i.e., a backwards jump to instruction B will occur). The entry for instruction D indicates that the following instruction to be executed corresponds to index 4 (instruction E).

Instruction E is a branch having two possible outcomes in this example. If instruction E is taken, execution will jump to index 0, and instruction A will be executed again. If instruction E is not taken in this example, the complex loop will exit, and additional instructions may need to be fetched from instruction cache 110. Thus, in this embodiment, the value "X" that is shown for the not-taken entry of instruction E is a special value (e.g., flag value) that indicates there is no corresponding instruction stored in instruction buffer 115 that can be executed in the event that instruction E is not taken, and additional instructions may need to be fetched. Accordingly, a first power saving mode used during execution of a complex loop may be exited when instruction E is not taken, and the complex loop will end. (Note that the value chosen for X may vary by embodiment, as long as it is distinct from values for other valid table entries for LDT 135.) Variations on the example illustrated relative to FIG. 4D may also occur in different embodiments (e.g., additional information such as entry valid bit, etc., may be maintained by LDT 135).

Branch prediction may also be used during execution of complex instruction loops. If a branch within a complex loop has two possible directions (such as instruction C in the embodiment of FIG. 4D, for example) a branch predictor may make a prediction as to the direction of the branch. (Target prediction may be unnecessary in some instances, however, since LDT 135 may already include entries indicating where in instruction buffer 115 a next instruction for either outcome of a branch may be found). Thus, in one embodiment, if a mis-predict occurs during execution of a complex instruction loop, execution pipeline 140 may provide feedback to variant loop control circuit 180, which can then correct execution by providing (different, correct) instructions from instruction buffer 115 to execution pipeline 140.

Figure 5:
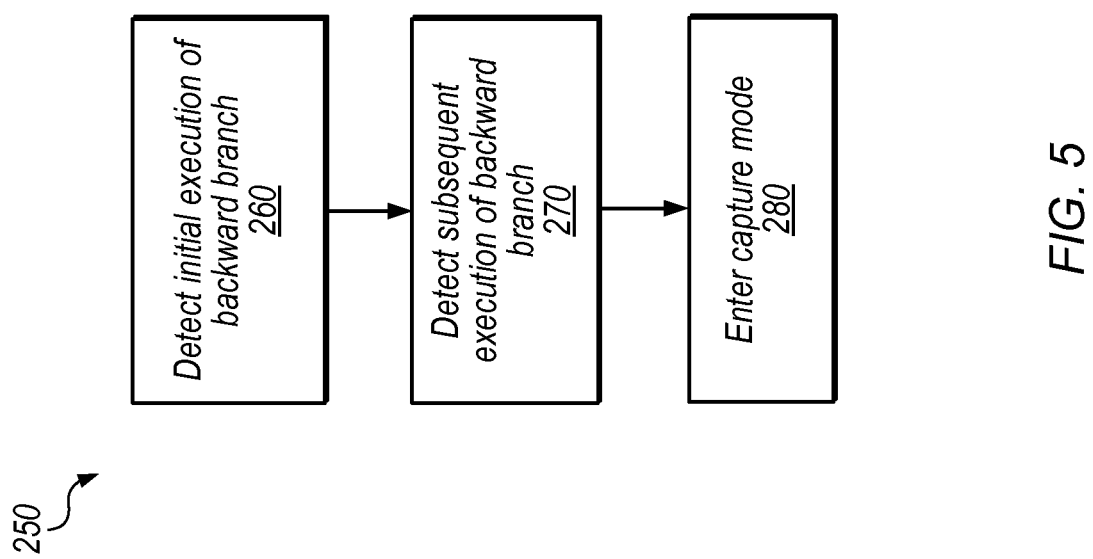
FIG. 5 is a flow diagram illustrating one embodiment of a method relating to a processor having multiple power saving modes.

Turning to FIG. 5, a flow chart of one embodiment of a method 250 is shown in accordance with techniques described above relating to a processor configured to enter into a plurality of power saving modes. In operation 260, an initial execution of a backward branch is detected by loop detection circuit 130. In operation 270, a subsequent execution of the same backward branch is detected by loop detection circuit 130. In operation 280, loop control circuit 130 causes processor 100 to enter a capture mode in which the processor forces all instructions in a group of instructions to be stored in instruction buffer 115. Capture mode may be enabled by disabling instruction bypass 154, for example, as described above.

In one embodiment, method 250 includes loop control circuit 130 causing processor 100 to enter a first one of a plurality of power saving modes after detecting a further subsequent execution of the backward branch (e.g., at least one additional iteration after capture mode is initiated). When capture mode is initiated, for example, the first loop iteration while in capture mode may ensure that instruction buffer 115 contains all loop instructions, after which power to instruction cache 110 can be reduced and execution pipeline 140 can be provided with loop instructions solely from instruction buffer 115.

The first power saving mode in method 250 may also include not reducing power to branch predictor 120. By keeping branch predictor 120 active during the first power saving mode, performance penalties may be lessened in the event of a short loop (branch predictor 120 may indicate that an exit is predicted for the loop, at which point normal power can be restored to instruction cache 110 and additional instructions may be fetched).

Example Device

Referring now to FIG. 6, a block diagram illustrating an embodiment of a device 300 is shown. One or more aspects of processor 100, described relative to FIG. 1, may be used in device 300 in various embodiments. In some embodiments, elements of device 300 may be included within a system on a chip. In some embodiments, device 300 may be included in a mobile device, which may be battery-powered. Therefore, power consumption by device 300 may be an important design consideration. In the illustrated embodiment, device 300 includes fabric 310, compute complex 320, input/output (I/O) bridge 360, cache/memory controller 345, graphics unit 350, and display unit 365.

Fabric 310 may include various interconnects, buses, MUX's, controllers, etc., and may be configured to facilitate communication between various elements of device 300. In some embodiments, portions of fabric 310 may be configured to implement various different communication protocols. In other embodiments, fabric 310 may implement a single communication protocol and elements coupled to fabric 310 may convert from the single communication protocol to other communication protocols internally.

In the illustrated embodiment, compute complex 320 includes bus interface unit (BIU) 325, cache 330, and cores 335 and 340. In various embodiments, compute complex 320 may include various numbers of cores and/or caches. For example, compute complex 320 may include 1, 2, or 4 processor cores (which may each include one or more processors and/or pipelines similar to that shown in FIG. 1), or any other suitable number of cores. In one embodiment, cache 330 is a set associative L2 cache. In some embodiments, a coherency unit (not shown) in fabric 310, cache 330, or elsewhere in device 300 may be configured to maintain coherency between various caches of device 300. BIU 325 may be configured to manage communication between compute complex 320 and other elements of device 300. Processor cores such as cores 335 and 340 may be configured to execute instructions of a particular instruction set architecture (ISA) which may include operating system instructions and user application instructions.

Cache/memory controller 345 may be configured to manage transfer of data between fabric 310 and one or more caches and/or memories. For example, cache/memory controller 345 may be coupled to an L3 cache, which may in turn be coupled to a system memory. In other embodiments, cache/memory controller 345 may be directly coupled to a memory. In some embodiments, cache/memory controller 345 may include one or more internal caches.

Graphics unit 350 may be configured to perform various graphics operations. Graphics unit 350 may include one or more processors and/or one or more graphics processing units (GPU's). Graphics unit 350 may receive graphics-oriented instructions, such OPENGL® or DIRECT3D® instructions, for example. Graphics unit 350 may execute specialized GPU instructions or perform other operations based on the received graphics-oriented instructions. Graphics unit 350 may generally be configured to process large blocks of data in parallel and may build images in a frame buffer for output to a display. Graphics unit 350 may include transform, lighting, triangle, and/or rendering engines in one or more graphics processing pipelines. Graphics unit 350 may output pixel information for display images.

Display unit 365 may be configured to read data from a frame buffer and provide a stream of pixel values for display. Display unit 365 may be configured as a display pipeline in some embodiments. Additionally, display unit 365 may be configured to blend multiple frames to produce an output frame. Further, display unit 365 may include one or more interfaces (e.g., MIPI® or embedded display port (eDP)) for coupling to a user display (e.g., a touchscreen or an external display).

I/O bridge 360 may include various elements configured to implement: universal serial bus (USB) communications, security, audio, and/or low-power always-on functionality, for example. I/O bridge 360 may also include interfaces such as pulse-width modulation (PWM), general-purpose input/output (GPIO), serial peripheral interface (SPI), and/or inter-integrated circuit (I2C), for example. Various types of peripherals and devices may be coupled to device 300 via I/O bridge 360.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A processor, comprising:
   an instruction cache; and
   a loop control circuit configured to detect instruction loops;
   wherein the loop control circuit is configured, during execution of an instruction loop, to cause the processor to enter a first power saving mode of a plurality of power saving modes in response to detecting a first specified number of iterations of the instruction loop,
   wherein the loop control circuit is configured, during execution of the instruction loop, to cause the processor to enter a second power saving mode of the plurality of power saving modes in response to detecting a second specified number of iterations of the instruction loop, wherein the second specified number is larger than the first specified number, and wherein the processor is configured to reduce power to the instruction cache during the first power saving mode and during the second power saving mode.

2. The processor of claim 1, further comprising:
an instruction buffer; and
an execution pipeline comprising one or more execution units;
wherein the instruction buffer is configured to receive instructions from the instruction cache and provide the instructions to the execution pipeline, and wherein the instruction buffer has a smaller instruction storage capacity than the instruction cache; and
wherein the instruction buffer is configured to provide the instructions to the execution pipeline during all of the plurality of power saving modes, wherein power consumption by the instruction cache is reduced in all of the plurality of power saving modes.

3. The processor of claim 2, wherein the loop control circuit is configured not to cause the processor to enter into either the first power saving mode or the second power saving mode in response to information indicating that a size of the instruction loop exceeds a storage capacity of the instruction buffer.

4. The processor of claim 1, wherein the loop control circuit is configured to detect the first specified number of iterations of the instruction loop by detecting the first specified number of executions of a backward branch instruction corresponding to an end of the instruction loop.

5. The processor of claim 4, further comprising:
a cache directory configured to indicate validity of contents of the instruction cache; and
an instruction translation lookaside buffer (ITLB);
wherein the first power saving mode comprises:
reducing power consumption by the instruction cache, the cache directory, and the ITLB.

6. The processor of claim 1, wherein the loop control circuit is configured, subsequent to causing the processor to enter the first power saving mode, to cause the processor to enter the second power saving mode from the first power saving mode.

7. The processor of claim 6, further comprising:
a branch predictor configured to predict outcomes of upcoming control transfer instructions using a structure that stores a branch predictor history;
wherein the loop control circuit is configured to cause the processor to enter the second power saving mode based on the branch predictor history being saturated during execution of the instruction loop.

8. The processor of claim 1, further comprising:
a branch predictor configured to predict outcomes of upcoming control transfer instructions using a structure that stores a branch predictor history;
wherein, in the first power saving mode, the processor is configured to reduce power to one or more structures not including the branch predictor; and
wherein, in the second power savings saving mode, the processor is configured to reduce power to the branch predictor.

9. The processor of claim 1, further comprising:
a loop detection table;
wherein the loop control circuit is configured to:

in response to detecting a first execution of a backward branch instruction, cause the processor to enter an observation mode in which information regarding a start address of the instruction loop is stored in the loop detection table; and in response to detecting a second execution of the same backward branch instruction, cause the processor to enter a capture mode in which the processor causes all instructions in the instruction loop to be stored in an instruction buffer, wherein the second execution is subsequent to the first execution.

10. The processor of claim 9, wherein the loop control circuit is configured to:
in response to detecting a third execution of the same backward branch instruction, cause the processor to enter the first power saving mode of the plurality of power saving modes, wherein the third execution is subsequent to the second execution;
wherein, in the first power saving mode, instructions are not read from the instruction cache, and wherein, in the first power saving mode, the instructions stored in the instruction buffer are provided to an execution pipeline for execution of the instruction loop during the first power saving mode.

11. The processor of claim 1, further comprising a variant loop control circuit that is configured to cause the loop control circuit to detect complex instruction loops that, when executed, include multiple backward branches that are taken; and
wherein the loop control circuit is configured to cause the processor to operate in the first power saving mode of the plurality of power saving modes during execution of complex instruction loops.

12. A method, comprising:
a loop control circuit of a processor detecting an initial execution of a backward branch in a group of one or more instructions; and
based on detecting a subsequent execution of the backward branch, the loop control circuit causing the processor to enter a capture mode in which the processor causes instructions in the group of one or more instructions to be stored in an instruction buffer coupled between an instruction cache and an execution pipeline;
in response to detecting three executions of the backward branch, the loop control circuit causing the processor to enter a first power saving mode of a plurality of power saving modes;
in response to detecting a number of executions of the backward branch that is larger than three, the loop control circuit causing the processor to enter a second power saving mode of the plurality of power saving modes, and
wherein, in each of the plurality of power saving modes, the loop control circuit is configured to cause the processor to reduce power to the instruction cache and provide the instructions in the group of one or more instructions from the instruction buffer to the execution pipeline.

13. The method of claim 12, wherein the first power saving mode does not include reducing power to a branch predictor configured to predict outcomes of upcoming control transfer instructions; and
wherein the second power saving mode includes additionally reducing power to the branch predictor.

14. The method of claim 12, wherein the capture mode includes forcing instructions transmitted via a bypass from the instruction cache to the execution pipeline to be stored in the instruction buffer.

15. The method of claim 12, wherein the processor reduces power to more devices during the second power saving mode than during the first power saving mode.

16. A processor, comprising:
an instruction cache;
an execution pipeline;
a branch predictor configured to predict outcomes of upcoming control transfer instructions using a branch predictor history;
an instruction buffer coupled between the instruction cache and the execution pipeline; and
a loop control circuit configured to detect instruction loops occurring in groups of one or more instructions;
wherein the instruction buffer has a smaller instruction storage capacity than the instruction cache and is configured to receive instructions from the instruction cache and provide the instructions to the execution pipeline;
wherein the loop control circuit is further configured to, during execution of an instruction loop:
cause the processor to enter a first power saving mode of a plurality of power saving modes based on detecting two or more executions of a backward branch; and
cause the processor to enter a second power saving mode of the plurality of power saving modes based on the branch predictor history becoming saturated during execution of the instruction loop.

17. The processor of claim 16, further comprising a variant loop control circuit configured to cause the loop control circuit to detect complex instruction loops that, when executed, include multiple backward branches that are taken; and
wherein the loop control circuit is configured to cause the processor to operate in a first one of the plurality of power saving modes during execution of complex instruction loops.

18. The processor of claim 16, wherein the loop control circuit is configured to cause the processor to exit the first power saving mode in response to the branch predictor predicting that an exit condition for the backward branch will be met.

19. The processor of claim 16, further comprising a cache directory configured to indicate validity of contents of the instruction cache, wherein the first power saving mode includes reducing power to the instruction cache and cache directory but not the branch predictor.

20. The processor of claim 19, wherein the second power saving mode includes reducing power to the instruction cache, the cache directory, an instruction translation lookaside buffer (ITLB), a fetch pipeline, branch target predictor, and the branch predictor.

* * * * *